Feb. 28, 1961 C. C. COWLEY 2,972,779
PLASTIC TUBING PROCESS
Original Filed June 7, 1954 3 Sheets-Sheet 1
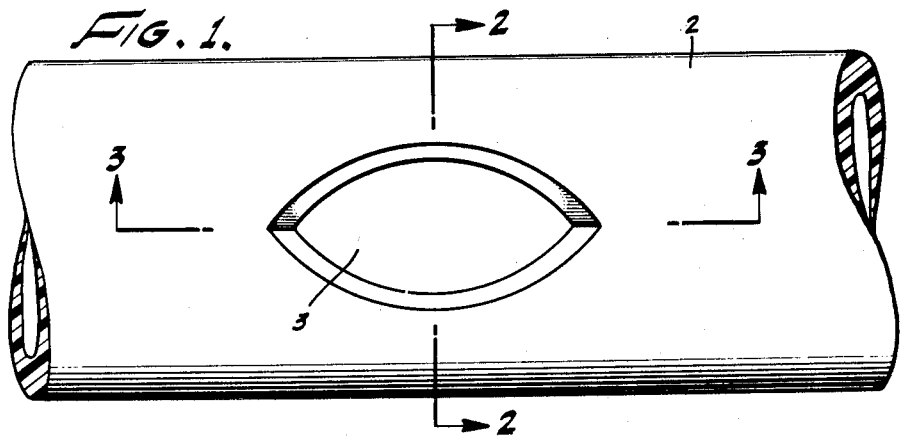
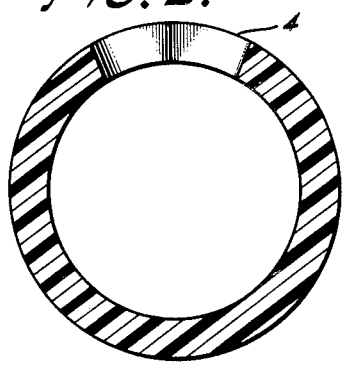
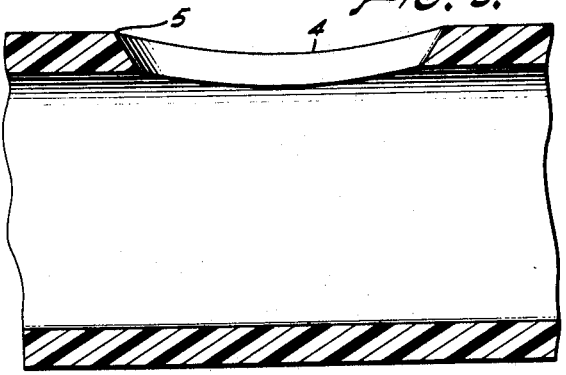
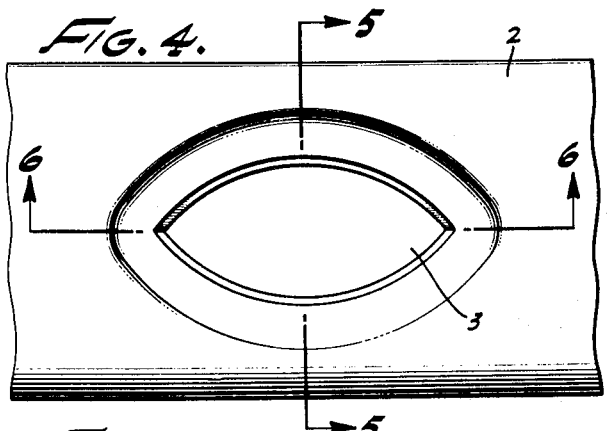
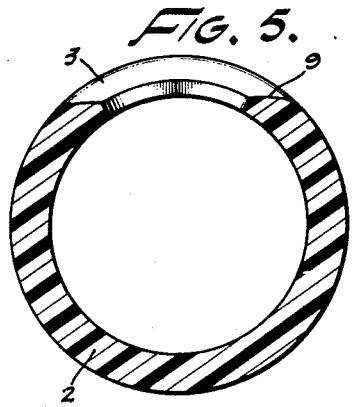
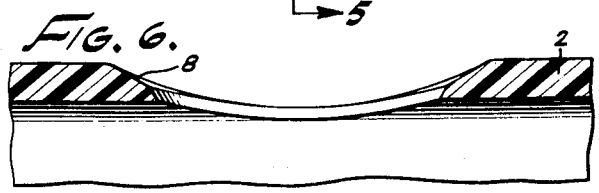
INVENTOR.
CALVIN C. COWLEY
BY Robert J. Merrick INVENTOR.
CALVIN C. COWLEY
BY Robert T. Merrick Feb. 28, 1961 C. C. COWLEY 2,972,779
PLASTIC TUBING PROCESS
Original Filed June 7, 1954 3 Sheets-Sheet 3
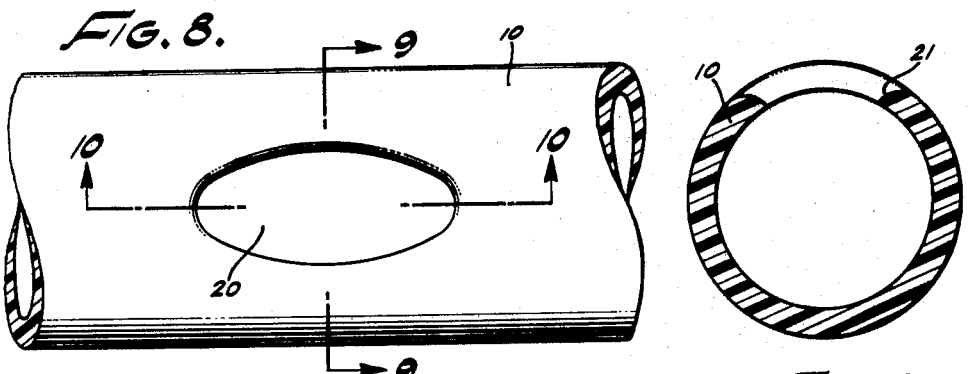
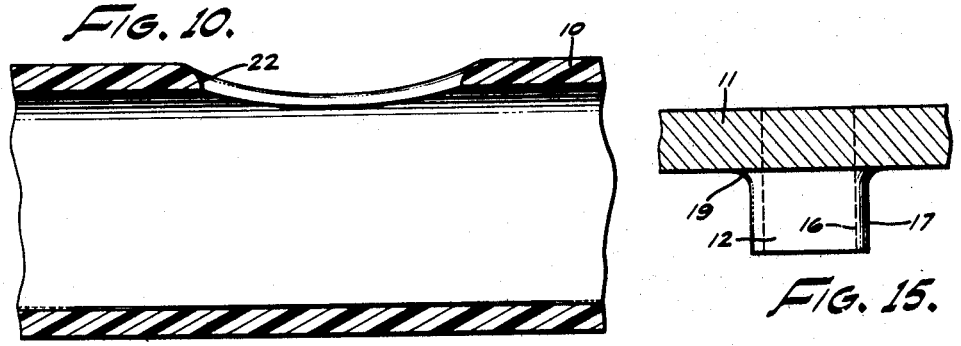
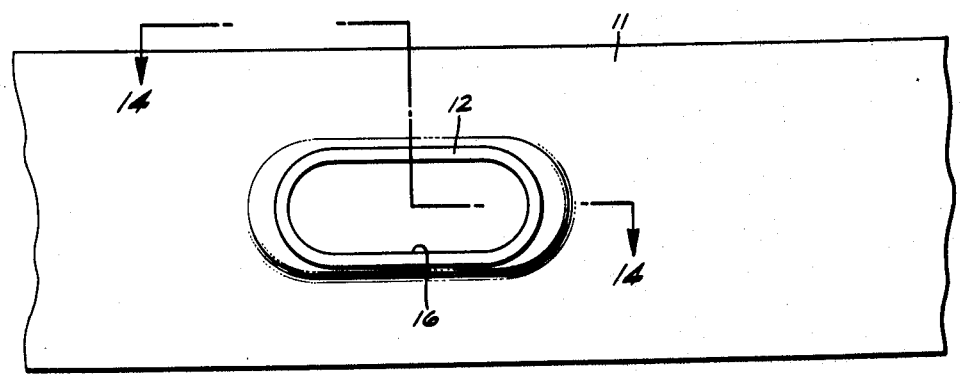
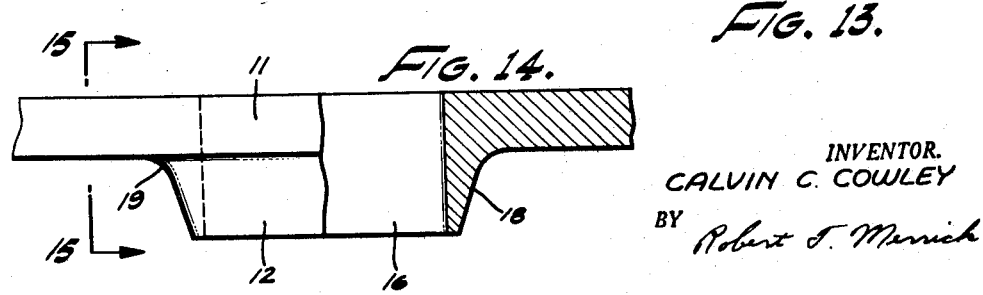
INVENTOR.
CALVIN C. COWLEY
BY Robert T. Merrick United States Patent Office 2,972,779
Patented Feb. 28, 1961

2,972,779
PLASTIC TUBING PROCESS
Calvin C. Cowley, La Canada, Calif., assignor to Don Baxter, Inc., Glendale, Calif., a corporation of Nevada Original application June 7, 1954, Ser. No. 434,879. Divided and this application Nov. 14, 1958, Ser. No. 773,998

5 Claims. (Cl. 18—48)

This invention relates to a plastic tubing having holes and to a process of producing the same and the invention is concerned particularly with a product having, or the process of producing, smooth holes.

This application is a division of the inventor's copending application Serial No. 434,879, filed June 7, 1954.

The product and process of the present invention are of particular value in connection with catheters. Catheters are flexible, surgical devices for insertion into and through body passages, such as the stomach, rectum, urethra and ureter for drainage, medication, exploration, dilation and the like. Rectal catheters are most often used for administering enemas, urethral for draining the bladder, etc. In some cases, especially when used for drainage after rectal surgery, the catheter may be left in place for days or even weeks. Insertion of catheters, especially into the urethra or ureter, is a painful process and catheters are therefore considered delicate surgical instruments. Catheters are often cleaned and reused and must be resistant to boiling and to chemicals, such as phenol or formalin, used for sterilization.

Heretofore catheters have been made of rubber. The rubber varies greatly in elasticity and suppleness, depending on the degree of vulcanization. Soft rubber catheters are highly elastic, but are porous and spongy. This causes difficulty in sterilization and proper sterilization treatment shortens their effective life. They also lack the necessary combination of rigidity and flexibility to penetrate small body canals. Hard rubber catheters contain comparatively large amounts of sulfur, sulfur compounds, and accelerators (often nitrogen compounds), which increase the likelihood of irritation and injury to delicate membranes. Catheters are sometimes used daily, or left in place for several days, and this may lead to serious chronic effects.

Plastic catheters can be transparent, do not hold odors for so long as rubber tubes, and some are more resistant to sterilization and to body fluids than rubber tubes. Their stiffness can be adjusted by raising or lowering their temperature. Plastic catheters may be made by molding, in much the same manner as rubber catheters. They can also be made from extruded tubing by remolding the end to form the tip and side holes as described in U.S. Patent No. 2,268,321, or more cheaply by remolding the tip of the tube and punching the desired holes in the wall of the tubing.

The holes formed by any of these processes, but especially by punching, are rough, and insertion of the catheter into a patient may be accompanied by unnecessary pain, irritation, and injury of the delicate membranes. If the catheters are made of rubber or similar materials, the holes can be smoothed by grinding. Tubing made of plastic such as vinyl polymers (polyvinyl chloride, polyvinyl chloride-acetate mixtures, etc.) have high flexibility and heat resistance and are particularly good for catheters but the holes cannot be smoothed by either grinding or solvents.

It is a general object of the present invention to provide a plastic tubing product or catheter which has a smooth hole and to provide a method of smoothing or producing smooth holes in plastic tubing. By means of the present invention it is possible to provide plastic tubing having smooth openings therein which are satisfactory as rectal and urethral catheters.

The apparatus of the present invention, together with various further objects and advantages of the invention will be more fully understood from the following description of the preferred form of the invention, the description being given in connection with the accompanying drawings, in which:

Figure 1 is an enlarged top view of a plastic tubing having a punched hole in the wall thereof of the type which is not smooth and if used as a catheter may cause pain to the patient, or injury;

Figure 2 is a fragmentary cross-section substantially on the line 2—2 of Figure 1;

Figure 3 is a fragmentary lengthwise section through the opening substantially on the line 3—3 of Figure 1;

Figure 4 is an enlarged top view of the plastic tubing having a hole therein after the hole has been smoothed in accordance with the present invention;

Figure 5 is a fragmentary cross-section through the hole substantially on the line 5—5 of Figure 4;

Figure 6 is a fragmentary lengthwise section through the hole substantially on the line 6—6 of Figure 4;

Figure 8 is an enlarged top view of a modified form of plastic tubing having smooth holes therein embodying the present invention;

Figure 9 is a fragmentary section through the opening substantially on the line 9—9 of Figure 8;

Figure 10 is a fragmentary lengthwise section through the opening substantially on the line 10—10 of Figure 8;

Figure 13 is an enlarged fragmentary plan view of the punching die used in both of the processes diagrammatically illustrated in Figures 11 and 12;

Figure 14 is a fragmentary section on the line 14—14 of Figure 13; and

Figure 15 is a fragmentary section on the line 15—15 of Figure 14.

Referring first to Figures 1 to 3 of the drawings, I have illustrated a portion of a plastic tubing 2 considerably enlarged. In order to illustrate more nearly the scale found preferable in practice I use in the production of the catheter plastic tubing having an inside diameter of 0.22" with a wall of 0.039". This tubing is made usually out of vinyl plastic, although various other thermoplastic materials may be used but the vinyl polymers heretofore mentioned are preferred, and it is also obvious that various sizes of plastic tubing may be employed.

In this plastic tubing there is illustrated the opening 3 punched from the tubing. In the process of punching the opening 3 from the tubing the practice is to flatten the tubing and cut the opening from the edge of the tubing by a round punch having, for example, a diameter of about ½". This produces an opening of the shape illustrated alongated in the length of tubing and having rather pointed corners. The opening may be, for example ⅛" wide by 5/16" long.

As illustrated in Figure 2 of the drawings, the outer edge of this opening, as indicated at 4, is sharp, the wall of the opening and the outer wall of the tubing being nearly at a 90° angle. As illustrated in the lengthwise section of Figure 3, the corner of the opening 5 at the ends of the opening are also quite sharp, the wall of the opening meeting the outer wall of the tube at an angle, for example, of about 60°. These angles are rough and if a plastic tubing having one or a plurality of such openings is made into and used as a catheter its insertion into a patient may well occasion pain, irritation or injury to delicate membranes.

Figure 7:
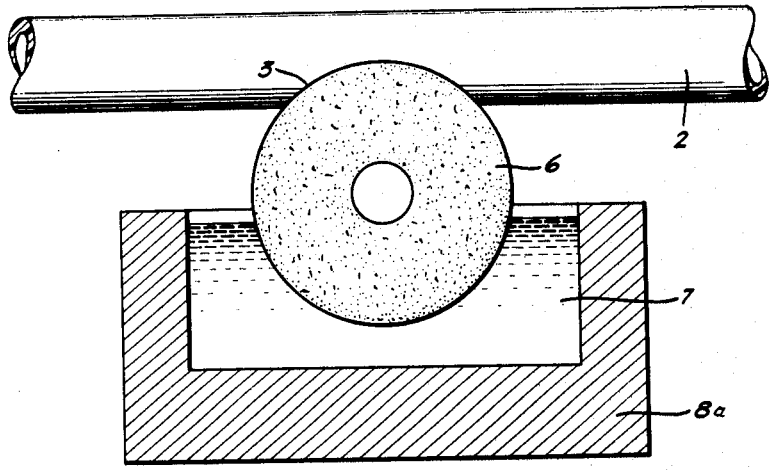
Figure 7 is a diagrammatic elevation of a process and apparatus for forming the smooth holed catheters of the type illustrated in Figures 4 to 6 inclusive of the drawings.

Now referring to Figure 7 of the drawings, in one form of the process for producing catheters or other products of the present invention, I employ a grinding wheel 6 of, for example, an emery stone, which is mounted for rotation and has its lower end immersed in a solvent 7 within a container 8a. The tubing 2, after it has had an opening punched therein, as illustrated in Figures 1 to 3 of the drawings, is then inserted with the opening 3 set against th emery wheel while the emery wheel is rotated. During the rotation of the emery wheel solvent is carried by the stone into contact with the walls of the opening. Preferably the emery wheel is rotated backward and forward and best results are obtained when the emery wheel "walks," i.e., turns farther in one direction than in another. The solvent 7 may be any solvent for the plastic of the tubing, for example, where polyvinyl chloride tubing is employed the solvents tetrahydrofuran or cyclohexanone can be employed. Without the solvent an emery stone is practically ineffective for smoothing the sharp edges of a punched hole in a plastic tubing. The solvent liquefies the plastic at the face of the opening so that the plastic flows away with the motions of the emery wheel and as a result the walls adjacent the opening have been smoothed.

Figures 4, 5, and 6 of the drawings illustrate the opening after the operation of smoothing and flowing some of the material from the surface of the walls of the opening. As illustrated in said figures the sharp edges of the opening have now been beveled away, as indicated at 8 and 9. Here the angle of the bevel has been reduced to about 30° as compared with the previous 45° angle, and moreover, because of the liquefying action even the corners between this bevel and the face of the tubing have been, to an extent, rounded and smoothed. Viewed as shown in Figure 5, the bevel has reduced the angle of the tubing which is originally about a 90° angle with the tangent to about a 45° angle with the tangent. Essentially in order to provide a polyvinyl catheter or other tubing with a smoothed opening in accordance with the present invention, the edges of the opening must be smoothed and the angle should be reduced to about 45° or less.

Figure 11:
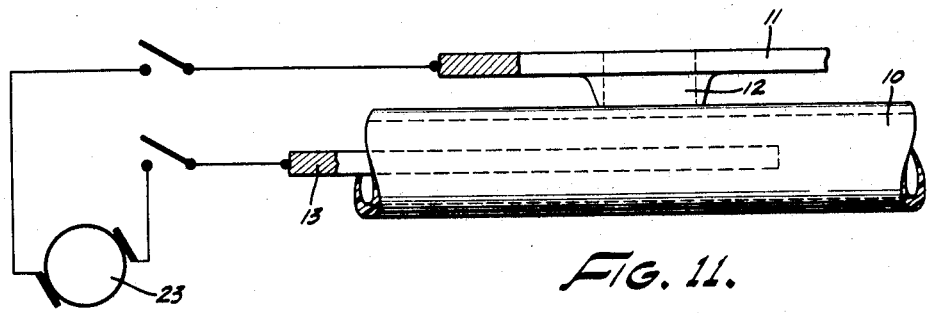
Figure 11 is a diagrammatic elevation of a process and apparatus for producing the plastic product illustrated in Figures 8 to 10 of the drawing.

Now referring to Figure 11 of the drawings, this figure illustrates diagrammatically an apparatus and process of producing the product of the present invention by punching and molding holes in a plastic tubing by a process designed to produce originally holes which are smooth, the holes produced in this case having no sharp edges at the surface but the walls of the holes are continuously curving. As illustrated in Figure 11, 10 indicates the plastic tubing to be processed, 11 indicates a metallic die having a punching element 12, the construction of which is shown on the enlarged Figures 13, 14 and 15. The electrode 13 may be in the form of a rectangular rod which is inserted within the tubing 10. The die 11 is also an electrode and, as diagrammatically indicated, electrodes 11 and 13 lead to a source of high frequency voltage 23. In forming the openings of the present invention the plastic material between the two electrodes becomes heated to the point where, when the die 11 is pressed downwardly to the electrode 13, it may cut an opening through the wall of the tubing, the wall of the tubing being sufficiently liquefied or melted so that the material will flow during the punching operation, the punch acting to melt through the wall of the tubing to form the opening while the walls of the tubing are sufficiently liquefied, or the material adjacent the walls liquefied, in order that it flows against the smooth surfaces of the punching point.

Figure 12:
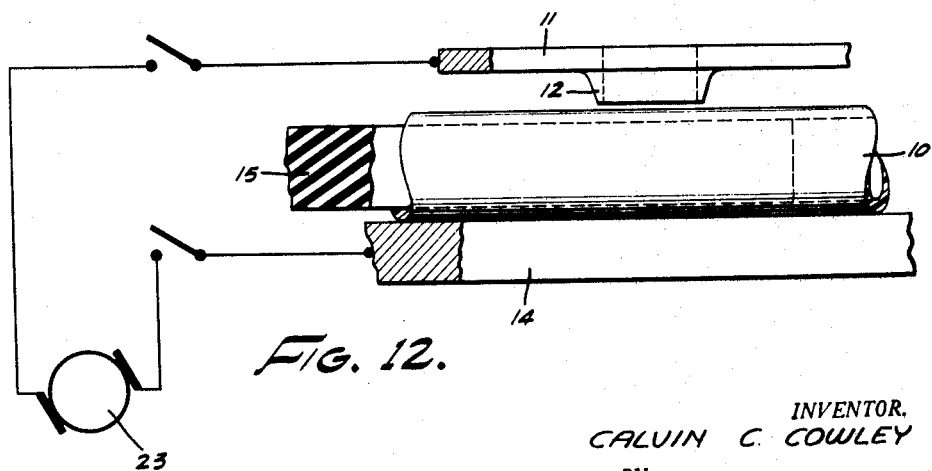
Figure 12 is a diagrammatic elevation of a slightly modified process and apparatus for producing the plastic product of Figures 8 to 10 inclusive of the drawings.

Figure 12 shows a modified form of the apparatus in which, in place of the electrode 13, an electrode 14 is placed against the bottom of the tubing 10 and an insulating member 15 inserted in the tubing against which the punch point 12 operates while the electrodes are charged.

As shown in Figures 13, 14 and 15 of the drawings, the punching element 12 is elongated in the direction of the tubing and provided with the opening 16 for the passage of material punched from the plastic wall. The exterior walls 17 and 18 of the punching point are smoothly curved, particularly in the neighborhood of the bottom face 19 of the die 11 in order to insure the removal of all angles or sharp edges.

By the use of the process illustrated in connection with Figures 11 to 15 of the drawings, I produce catheters or other plastic tubing products having openings therein of the form shown in Figures 8, 9 and 10 of the drawings. In said figures the tubing 10 is indicated as having a more or less oval-shaped opening 20 elongated lengthwise of the tubing, and as indicated in Figures 9 and 10, both the walls of the opening 21 as viewed in the cross-section, and 22 as viewed lengthwise, have smooth curves from the top face of the tubing down to the interior of the tubing thus providing no sharp edges at the opening.

From the foregoing description it will be seen that produce plastic tubing having smooth shaped openings therein, these openings having a continuous curvature from the outer wall of the tubing inwardly of the walls of the opening, or there is provided a bevel at the edges of the opening reducing the angle present to less than 45°. Moreover, in both forms of the process of the present invention these openings are produced by a process which involves liquefaction of the tubing around the opening, this liquefaction being effected either by solvents or by heat, and there is combined with such liquefaction a contact of the tubing with some mechanical element, such as an emery stone or smooth face die, so as to cause a molding of the walls of the opening into smooth surfaces.

In accordance with the present invention it is possible therefore to produce plastic tubing with openings by a process which is inexpensive and which produces openings sufficiently smooth so that the product may be used as catheters without danger of pain, irritation or injury to delicate membranes.

Plastic catheters made in accordance with the present invention have the advantage over rubber catheters in that they do not contain appreciable quantities of sulfur, sulfur compounds or other ingredients which are liable to cause irritation or injury to delicate membranes. The present invention provides a means by which plastic tubing which is superior to rubber in these respects may be made into catheters having smooth wall openings such as will not damage membranes or cause pain or irritation.

While the particular forms of the invention herein described are well adapted to carry out the objects of the present invention, this invention is of the scope set forth in the appended claims.

I claim:

1. A process of producing a polyvinyl tubing with a smoothed opening therein, which process comprises, first punching an opening in the tubing, then simultaneously grinding and dissolving the tubing at said opening by contacting the walls of the opening with a moving grinding element supplied at its surface with a solvent of a polyvinyl polymer.

2. A process of producing a polyvinyl tubing with a smooth opening therein, which process comprises, first punching an opening in the tubing, then simultaneously grinding and dissolving the tubing at said opening by contacting the walls of the opening with a moving grinding element supplied at its surface with a solvent of a polyvinyl polymer, the combined action of the solvent and grinding element being continued to provide a bevel at the outer edge of the opening.

3. A method of making a catheter comprising: cutting a section of an extruded, flexible plastic tube to a predetermined length; flattening a portion of the tube near one end; punching an opening in the edge of said tube while in a flattened condition; allowing the tube to resume its normal shape; and removing the sharp edges of the opening by a simultaneous grinding and solvent step, wherein the sharp edges are contacted with a grinding wheel wet with a solvent for the plastic tube.

4. A method of making a catheter as set forth in claim 3 wherein the grinding wheel oscillates to-and-fro, the movement in one direction being greater than the movement in the other direciton.

5. A method of making a catheter as set forth in claim 3 wherein the flexible, plastic tube is made of a material selected from the class consisting of polyvinyl chloride, polyvinyl acetate, and mixtures thereof and the solvent is selected from the class consisting of tetrahydrofuran and cyclohexanone.

References Cited in the file of this patent

UNITED STATES PATENTS

| | | |
|---|---|---|
| 1,339,789 | Rothwell et al. | May 11, 1920 |
| 1,839,699 | Parkhurst | Jan. 5, 1932 |
| 2,259,488 | Raiche | Oct. 21, 1941 |
| 2,271,477 | Davis | Jan. 27, 1942 |
| 2,308,484 | Auzin et al. | Jan. 19, 1943 |
| 2,314,262 | Winder | Mar. 16, 1943 |
| 2,428,407 | Auzin | Oct. 7, 1947 |
| 2,481,488 | Auzin | Sept. 13, 1949 |